United States Patent [19]

Pettit

[11] Patent Number: 5,267,698
[45] Date of Patent: Dec. 7, 1993

[54] COCONUT GRINDER

[76] Inventor: Ashma B. Pettit, 1926 Innwood Rd., Atlanta, Ga. 30329

[21] Appl. No.: 874,693

[22] Filed: Apr. 28, 1992

[51] Int. Cl.[5] .............................................. A47J 43/25
[52] U.S. Cl. ...................................... 241/168; 30/169; 30/296.1; 30/355; 99/538; D7/678; 241/273.2
[58] Field of Search ................ 30/169, 296.1, 355, 30/172; 241/168; 99/538, 567, 584, 537, 510; 426/617; D7/678

[56] References Cited

U.S. PATENT DOCUMENTS

| | | | |
|---|---|---|---|
| 584,526 | 6/1897 | Simons | 30/296.1 |
| 709,917 | 9/1902 | Marshall | 30/296.1 |
| 2,286,190 | 6/1942 | Abrahamsen | 30/355 |
| 2,633,883 | 4/1953 | Hernandez et al. | 241/282.2 X |
| 2,783,537 | 3/1957 | Gringer | 30/355 X |
| 2,843,932 | 7/1958 | Ferguson | 30/355 X |
| 4,350,088 | 9/1982 | Rubio, Jr. | 99/538 |
| 4,383,479 | 5/1983 | Hill | 30/120.1 X |
| 4,441,410 | 4/1984 | Thompson | 99/537 X |

*Primary Examiner*—Mark Rosenbaum
*Assistant Examiner*—Frances Chen

[57] ABSTRACT

A mechanical device to be used for removing coconut meat from coconut shell consisting of a serrated edge and a clamping device that will be attached to a stationary flat surface and will hold the tool in an upright position. The serrated edge will be used to grind coconut meat away from coconut shell, one half shell at a time.

1 Claim, 1 Drawing Sheet

COCONUT GRINDER

BACKGROUND OF THE INVENTION

This invention relates to a nut removing tool. More specifically the present invention relates to easy removal of coconut meat from coconut shells.

DESCRIPTION OF PRIOR ART

Many consumers prefer to use fresh coconut for consumption. However, removal of coconut meat from coconut shell is rather tedious and time consuming. After having the coconut cracked open, it is baked in an oven and the meat is removed from the shell with a sharp object. Then it is grinded or chopped or sliced for usage.

There is a tool available on the international market but the tool is rather large and cumbersome for usage and storage. When using the tool, one has to sit on part of the tool so that the tool can be used effectively. This tool consist of part steel and part wood. No patent was found.

The present invention will be easy to use, care for and store.

SUMMARY OF THE INVENTION

The primary objective of the present invention is to provide a tool that can be used to remove coconut meat from a coconut shell. By pressing inside half of a coconut against the coconut grinding edge and continuously rotating the coconut, the coconut meat will fall off and be shredded/grinded into small pieces (almost pulp like consistency). This process will take only a fraction of the time compared to the conventional method of coconut meat removal.

In addition, the objective of the present invention is to provide a tool that is easy to handle, requiring no skill or training to use and to provide a tool that can be easily stored, that requires a minimum amount of drawer space in the kitchen.

Further objectives and advantages of the invention is found in the accompanying drawing and its ensuing descriptions.

DRAWING FIGURES

FIG. 1 shows an overall perspective view of the tool.

DRAWING REFERENCE NUMERAL

1 Bottom plate
2 Clamping device
3 Clamping jaw
4 Vertical plate
5 Top horizontal plate
6 Wider end
7 Grinding edge
8 Grinder stopper plate
9 Support plats

Figure 1:
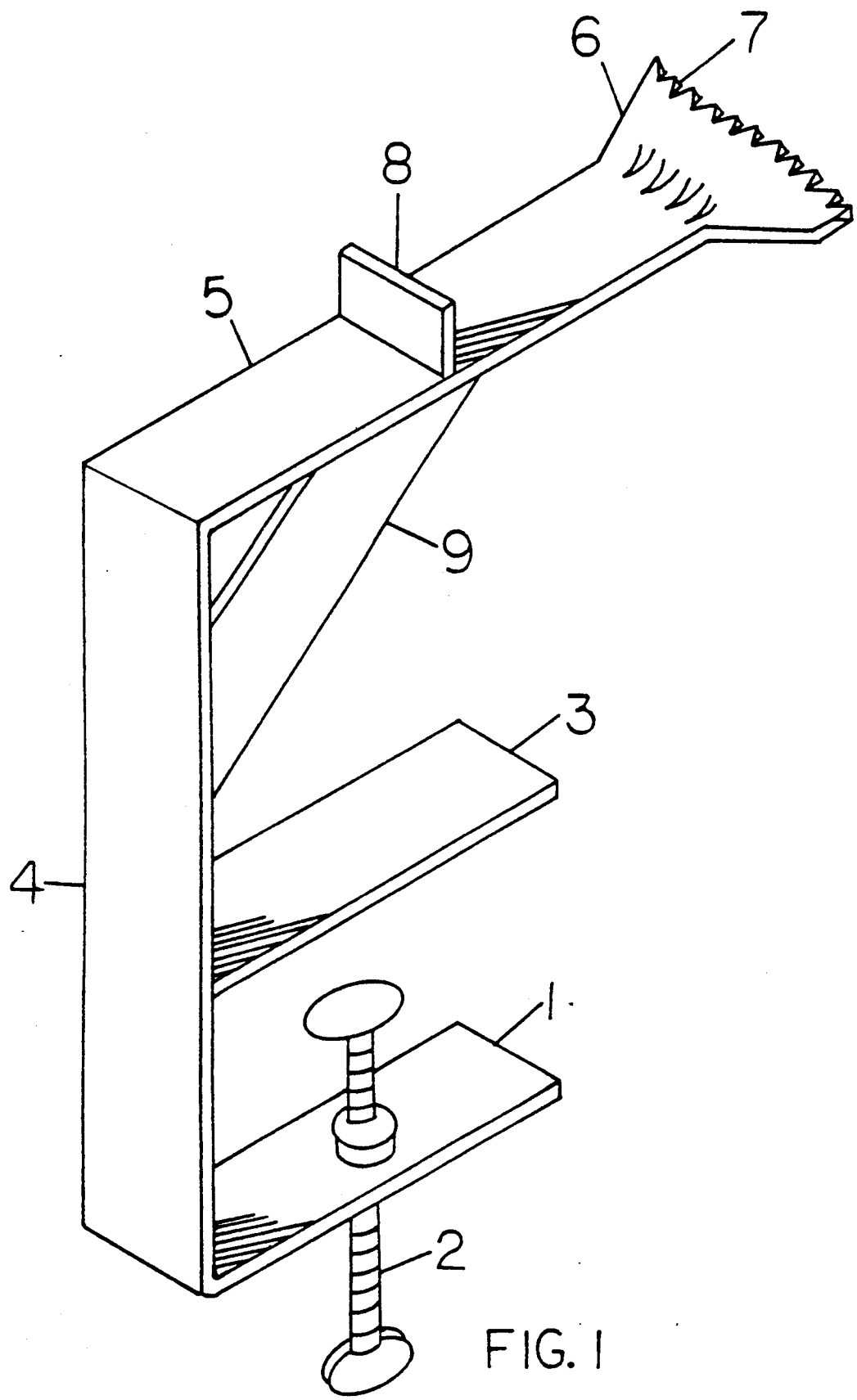
FIG. 1 shows a single piece tool according to the present invention. The tool comprises of a bottom plate 1 which is bent horizontally outward to form a horizontal arm. A hole is cut in the center of the horizontal plate 1 such that a clamping device 2 can be attached to it. The clamping device 2 is stopped by a clamping jaw 3 that is attached to the vertical plate 4 of the tool. A stationary flat surface is inserted between plate 1 and plate 3. The two plates 1 and 3 and the clamp 2 is used to secure the tool to a stationary flat surface and the vertical plate 4 holds the tool in the upright position.

The vertical plate 4 and the top horizontal plate 5 share a common end that separates the two sections by a bend. Plate 5 is bent horizontally outward and has a wider end 6. The end 6 is formed outward and is raised up by a few degrees. A straight edge with a zero rise in elevation is acceptable. The end 6 has serrated grinding edge 7 that is either notched with sharp points or rectangular. The coconut half is inserted over the edge 7 and rotated against edge 7 to grind away the coconut meat. A grinder stopper plate 8 is attached to plate 5 to prevent the grinded nut meat pieces from falling over the tool. The grinder stopper plate 8 is not necessary to make the tool work. Plate 5 is additionally supported by two plates. Two plates 9 are attached on either side of plate 4 and plate 5. Plates 9 are used to give additional support if plate 6 is made of material that will flex when in use. When using strong steel that will not flex when in use, than, these plates 9 are not necessary.

SINGLE STEP OPERATION

The single step tool of FIG. 1 will enable the user in removing fresh coconut meat from coconut shell efficiency and easily. The coconut is cracked open in two halves.

The tool is attached to a flat surface by centering a stationary flat surface between the bottom plate 1 and the clamping jaw 3 of the tool. The tool is then secured in place by tightening the clamping device 2. The vertical plate 4 will hold the tool in the upright position. The top horizontal plate 5 of the tool with the grinding edge 7 that will do the grinding will end up being parallel to the stationary flat surface and a few inches up in the air.

A plate or catch basin of some type is located below the top horizontal plate 5 and against the vertical plate 4.

The coconut half with split end is inserted over the serrated grinding edge 7. The coconut is run backwards, forwards, and rotated against the serrated grinding edge 7. The coconut pieces will fall onto the collection pan. The motion is repeated until most of the coconut meat is removed from the coconut shell.

I claim:
1. A device for shredding coconut comprising:
   a bottom horizontal plate;
   a vertical plate extending from said bottom plate;
   a top horizontal plate depending from a top end of said vertical plate, terminating in a substantially linearly serrated grinding edge, having a vertical grinder stopper plate attached thereto mediate said vertical plate and said grinding edge;
   a clamping jaw depending from said vertical plate intermediate said bottom plate and said top horizontal plate;
   clamping device projecting from said bottom plate adapted for urging said clamping jaw against a support surface; and
   at least one support plate interconnecting said vertical plate and said top horizontal plate and above said clamping jaw.

* * * * *